A. N. SEVERANCE.
VAT OR PRESS BOX FOR CHEESE.
No. 7,328. Patented Apr. 30, 1850.
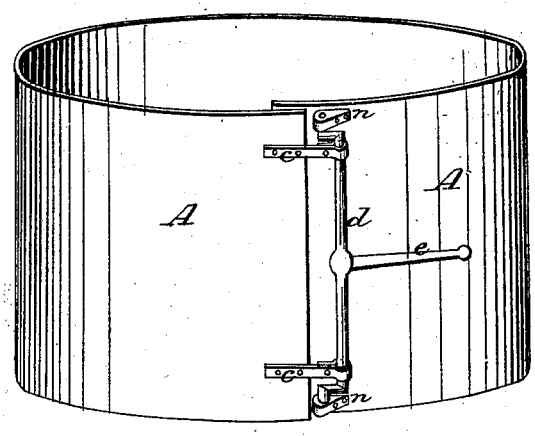

UNITED STATES PATENT OFFICE.

AUGUSTUS N. SEVERANCE, OF CHERRY VALLEY, OHIO.

VAT OR PRESS-BOX FOR CHEESE.

Specification of Letters Patent No. 7,328, dated April 30, 1850.

*To all whom it may concern:*

Be it known that I, AUGUSTUS N. SEVERANCE, of Cherry Valley, in the county of Ashtabula and State of Ohio, have invented a new and Improved Mode of Constructing Cheese Vats or Hoops in which Cheese is Pressed; and I do hereby declare that the following is a full and exact description thereof, reference being had to the accompanying drawing and to the letters of reference marked thereon.

The nature of my invention consists in providing in the side of the cheese vat a movable lap joint which is operated by a crank or lever to enlarge the vat, and thus allow its free removal from the cheese. The accompanying drawing is a perspective view of a cheese vat or hoop thus constructed in which—

A A represent the sides of the vat which I usually make of iron, though wood will answer.

c c represent two strips of iron, one end of each of which is riveted to the side of the vat near the lap joint above mentioned in such a manner as to pass the joint on the outside, and connect with the crank d around which it is riveted, the end bearings of the crank being fastened to the vat on the opposite side of the joint by the eyes n, n, which may be riveted to the side of the vat, or attached to it by bolts passing from the inside of the vat by which the eyes may be shifted so as to enlarge or contract the size of the vat for pressing cheese of different sizes, the lap of the joint being sufficient for so doing.

e, represents a lever which is attached to the crank and projects from it in the direction in which the inner bearings lie from a line drawn through the end bearings.

The parts are represented in the position they occupy when the cheese is under pressure, in which position they have a tendency to remain in consequence of the crank being turned past its center toward the vat it being kept from going farther by the lever e, striking the side of the vat. When it is desirable to remove the vat from the cheese, the crank is turned half around by the lever e, which operation expands the vat about an inch in circumference, and thus allows it to be removed and replaced with ease and facility.

What I claim as my invention, and desire to secure by Letters Patent is—

Providing cheese vats with a movable joint which is operated by a crank or lever to enlarge and diminish the size of the vat substantially in the manner and for the purposes herein set forth.

AUGUSTUS N. SEVERANCE.

Witnesses:
ELISHA Y. KNEELAND,
THOMAS P. HOW.